Patented Nov. 7, 1939

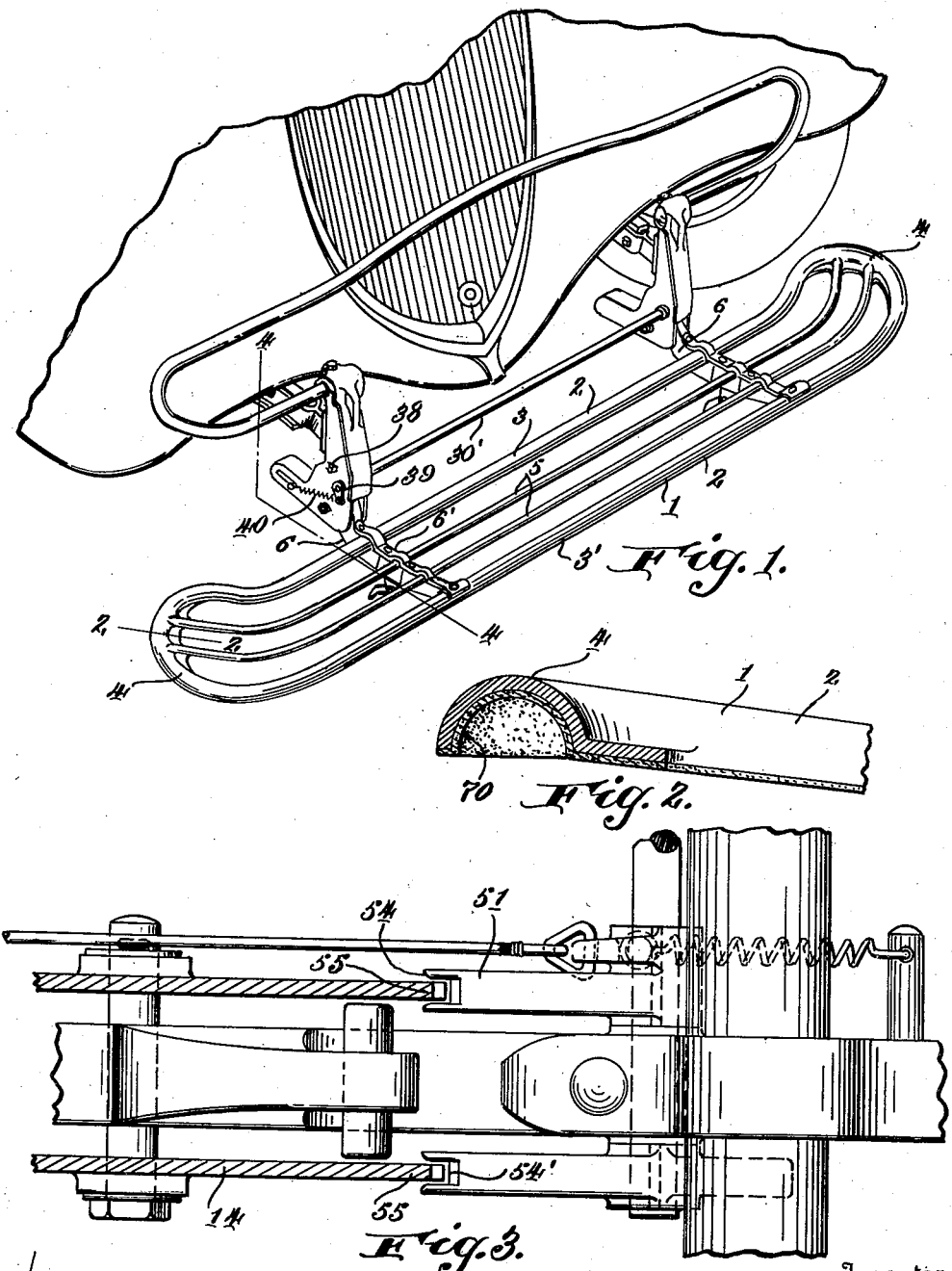

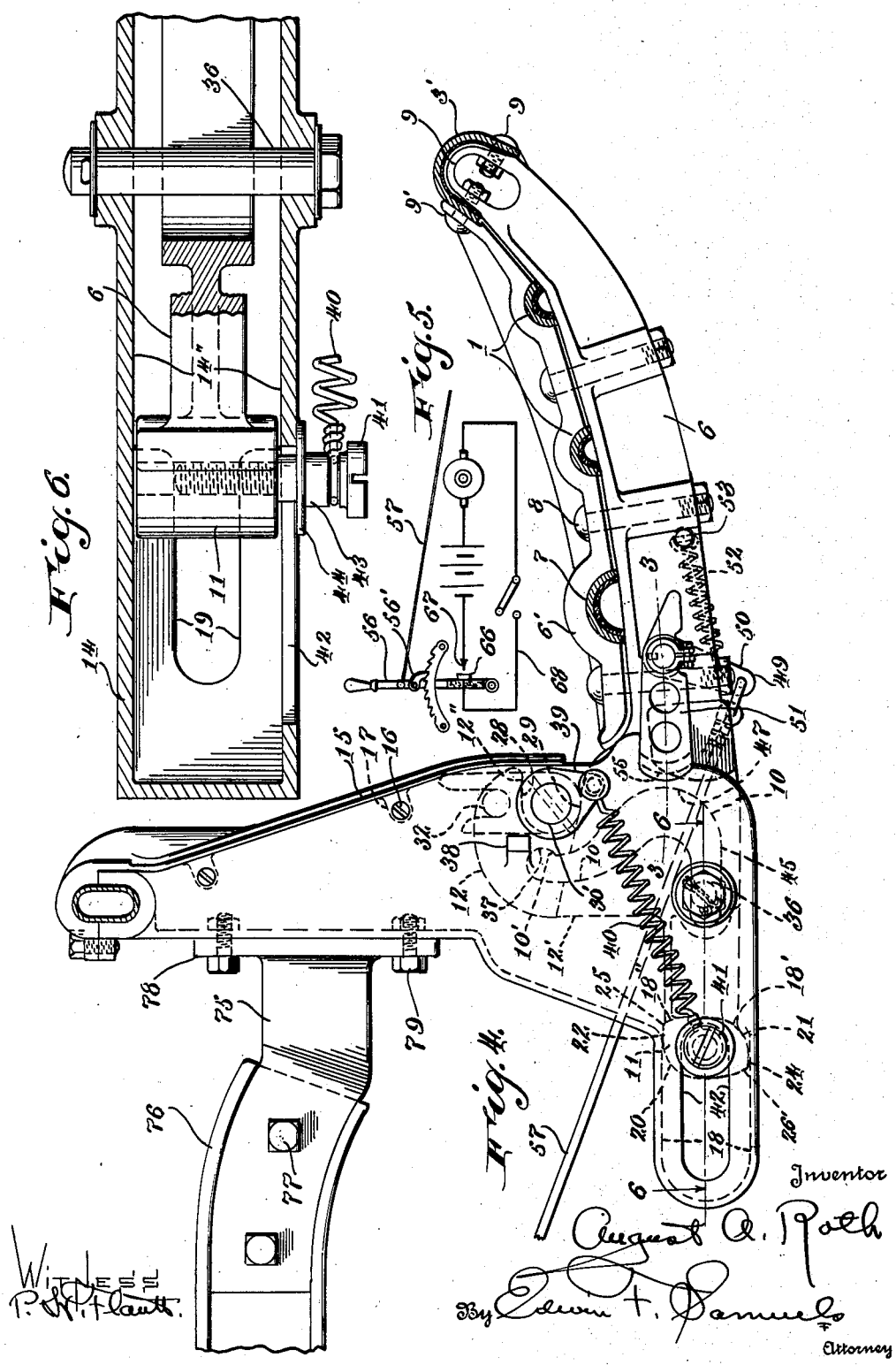

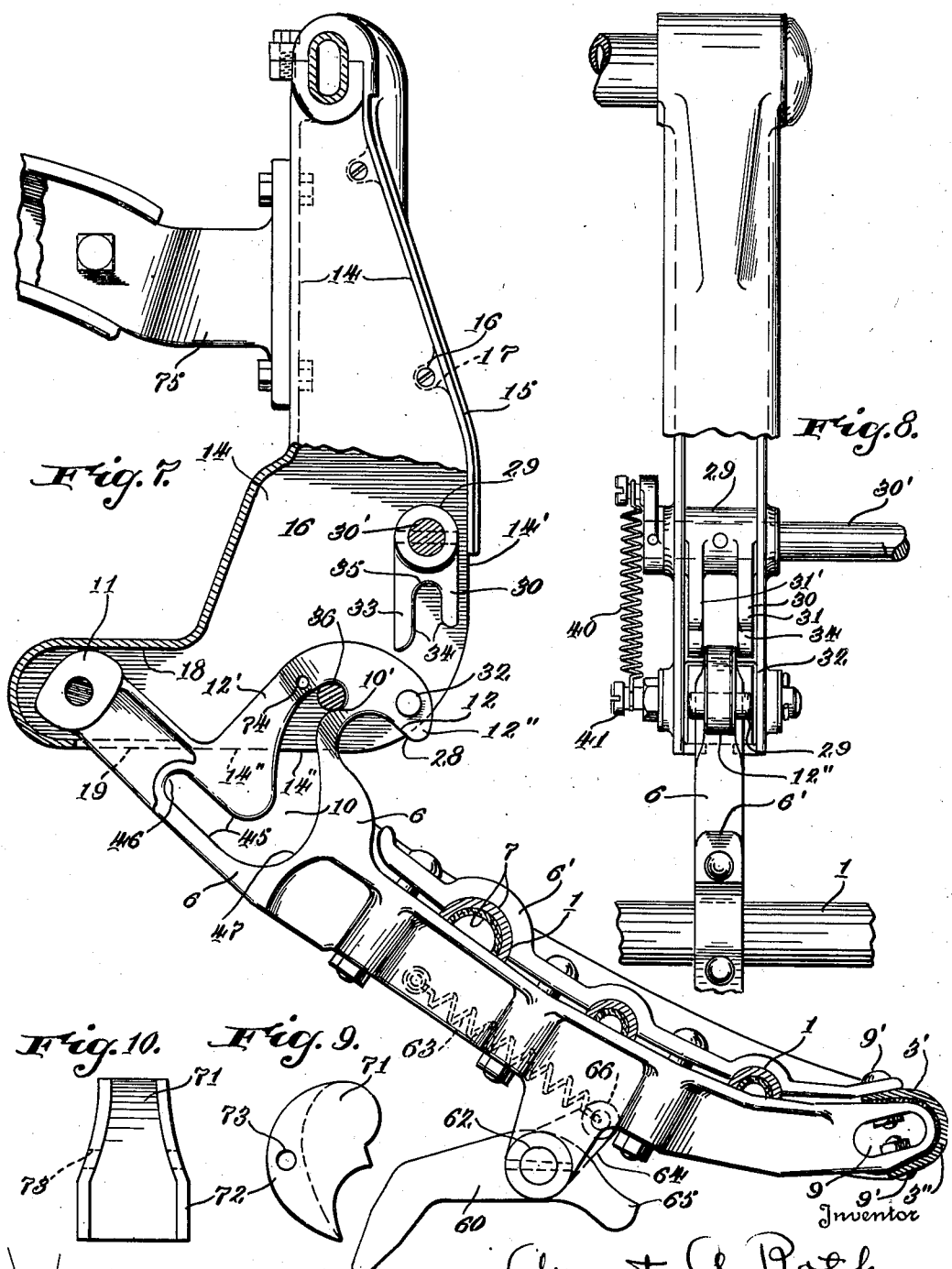

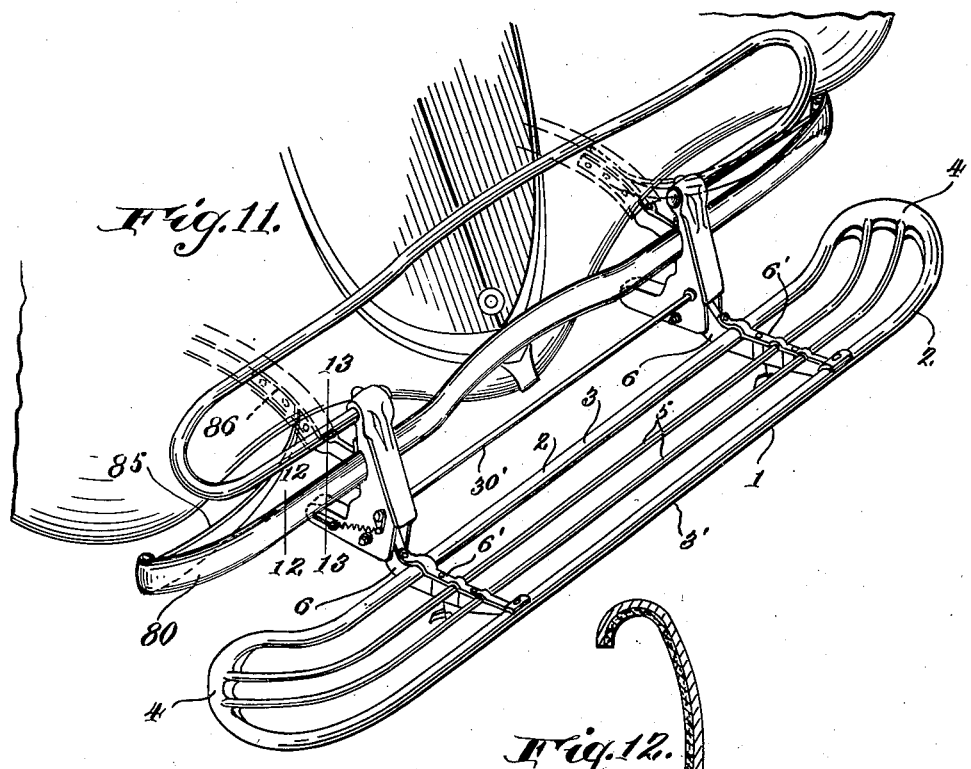

2,179,163

UNITED STATES PATENT OFFICE 2,179,163

PICKUP FENDER

August A. Roth, Baltimore, Md.

Application February 26, 1936, Serial No. 65,779

18 Claims. (Cl. 293—42)

The invention relates to a fender for motor vehicles and the like of the type which is adapted to contribute to the safety of pedestrians who may be in the path of the vehicle. In performing this function it operates by picking up the pedestrian to prevent him from coming in contact with the front of the vehicle or falling under the vehicle so that he might be crushed by the wheels or depending parts of the vehicle structure. The construction shown is also adapted in accordance with the preferred form to serve as a bumper, thus saving the vehicle from harmful contact with fixed objects and passing vehicles and the like.

The object of the invention is to improve upon the existing constructions and particularly, to reduce the expense incident to the repair and reconstruction of the fender in case of excessive shocks due to collisions and the like; to reduce the wear incident to use and also to confine such wear as is unavoidable to portions of the mechanism as to which wear is comparatively harmless and to parts which are easily replaced and capable of production at small cost; to simplify the construction and avoid rattling; to provide a multiplicity of supports for the fender at each side, particularly in the raised or normal position so as to distribute the shock incident to bumping, and also to avoid rattling and undue wear; to give a controlled operation of the fender; to improve the controlling means and avoid displacement of the fender from normal position incident to small thrusts or bumps in parking; to cause the fender to move to pickup position without fail without regard to the location on the fender of the point of first contact with the person or object to be picked up; to provide improved guide means for the fender as it moves from normal to pickup position and is returned to normal position and to so control the guides that they are properly disposed under all conditions to receive the fender and move to supporting position when the fender is raised after being dropped to pickup position; to prevent binding of the fender as it moves from normal to pickup position and vice versa; to provide easy and convenient means for adapting the fender to vehicles of different heights or road clearance; to provide means for so controlling the fender as to prevent it from being raised from pickup position while in operation so that the fender might pass over a pedestrian and permit him to be crushed beneath the vehicle; to provide a fender basket and body so designed that it can be easily stamped or otherwise produced in a single piece of such form as to provide the maximum resistance to shock with the minimum weight and to make it easy of repair when distorted or deflected from its original shape; also to provide for the use of the regular type of bumper in connection with a pickup fender.

The new construction also includes other improvements which will be more fully described in the specification.

In the accompanying drawings I have described a fender embodying the improvements of the invention in the preferred and in a modified form.

In the drawings:

Figure 1 is a perspective view showing fragmentarily the front of a motor vehicle to which the fender is applied, the same being shown in normal, raised or bumping position.

Figure 2 is a fragmentary section on the line 2, 2 in Figure 1.

Figure 3 is a fragmentary horizontal section on the line 3, 3 in Figure 4.

Figure 4 is an elevation of one of the supporting brackets, the fender being shown in section on the line 4, 4 in Figure 1, and being in normal raised or bumping position.

Figure 5 is a circuit diagram also showing fragmentarily a device for locking the fender in raised position for use when the vehicle is parked or under similar circumstances.

Figure 6 is a section on the line 6, 6 in Figure 4.

Figure 7 is a section on line 4, 4, Figure 1, showing the fender in the lowered or pickup position, the bracket being broken away as to the bottom half to show the internal construction of the fender operating and supporting mechanism.

Figure 8 is a fragmentary plan showing the bracket on the left side of the vehicle, the bracket cover being broken away to show the underlying parts which include one bumper thrust arm shown fragmentarily and a fragment of the basket.

Figure 9 is a side elevation of a plug used to close the upper end of the upright cam slot to adapt the device for use with a low hung vehicle by reducing the length of the path of the fender as it is dropped so that the extent to which it is depressed from normal position is reduced.

Figure 10 is an elevation of the same looking from the rear, i. e., from the left in Figure 9.

Figure 11 is a perspective view corresponding to Figure 1, showing a slightly modified construction.

Figure 12 is a section on the line 12, 12 in Figure 11.

Figure 13 is a fragmentary elevation showing the upper portion of the bracket of Figure 11, the bumper being shown in section on the line 13, 13 in Figure 11, and the bottom of the bracket being broken away.

Figure 14 is a section on the line 14, 14 in Figure 13.

Referring to the drawings by numerals, each of which is used to indicate the same or similar parts in the different figures, the fender shown includes a basket member 1, which in the form shown may be stamped or pressed or otherwise produced in a single piece. It comprises an outside frame portion 2 which is referred to for convenience as of oval outline with parallel sides 3, 3', running transversely of the vehicle, and rounded ends 4, the sides 3 being preferably straight for the greater portion of their length. The width of the fender basket which lies in the direction of the length of the vehicle is shown as approximately from one sixth to one eighth of the length of the basket. The basket also includes intermediate longitudinal members 5 which are parallel to the sides 3, 3', and formed integrally with the frame 2 joining the frame at the ends 4, and the two ends of the basket are deflected backwardly after the manner of the conventional bumper.

The frame of the basket 1, and the members 5, 5 are preferably hollow shapes which are shown as half round in cross section, the open sides being turned downwardly with the exception of front side 3'. The front portion of the frame at 3' is U shaped with the cross arm of the U at 3" turned forwardly and the legs somewhat elongated, extending rearwardly and inclined downwardly. These hollow shapes give greatly increased strength in proportion to the weight and are produced by pressing or stamping or the like with comparative ease, and at relatively small cost as compared to the ordinary tubing, particularly when the necessary fittings are included.

The description of the form of the various parts with the terms up and down, etc. has particular reference to the normal or raised position of the fender.

The fender basket 1 is supported on thrust arms 6, 6 which as shown extend across the basket and are provided each with a clamping strap 6' whereby the frame members 3, 3' and the longitudinal members 5, 5 are secured to the thrust members on top of which said members are placed in the form shown. These straps 6' are provided with downwardly disposed seats 7 best shown in Figure 4 which take over the longitudinal members 3, 3', 5, 5, the straps being secured by bolts 8 which pass downwardly through the thrust members 6 between the members 3, 5, 5, 3'. The U shaped section of the member 3' serves to enclose the ends 9 of the thrust members 6 which as shown are hollow at the forward end, and the member 3' and the forward end of the straps 6' being secured thereto by bolts 9' which extend through the legs of the U shaped section 3', being secured by nuts on the inside of the hollow end 9. The forwardly disposed U section 3' contributes to the pleasing appearance of the construction by concealing the ends of the thrust members and even more important than this, it presents an increased resistance to the thrust incident to contact with obstacles in the bumping and pickup operations.

The entire structure of the basket with the upwardly convex members which compose the frame and crossbars of the same and the backward slope of the ends with their rounded curvature, contribute to the pleasing appearance of the fender. This construction also gives the maximum resistance to the thrust due to bumping and is easy to repair and capable of cheap production. The manner of securing the basket to the thrust members contributes to its resistance to such thrusts and provides for easy removal and replacement by loosening the bolts 8 and the top bolt 9' and removing the top straps 6 whereby the basket is released.

The thrust members 6 are each formed at their rear ends with an upright cam slot 10, a rear follower 11 and a supporting hook 12, the operation, arrangement and formation of which constitute important features of invention, as hereinafter more fully described. The follower 11 and the hook 12, and the rear portion of the thrust arm 6, operate in supports or brackets 14 which are mounted on the front ends of the vehicle chassis frame from which in the preferred form they project downwardly substantially as shown, although the exact arrangement of these brackets 14 and many details of the design are not essential to the invention in its broader scope.

The brackets 14 as shown are U shaped in horizontal cross section with the legs of the U projecting forwardly, the brackets being open at the front side at 14' and at the bottom at 14". The front opening 14' is closed at the top by means of cover plate 15 held by means of screws 16 passing through lugs 17 formed on plates 15. The rear ends of the thrust arms 6 and their cooperating parts are in the normal position of the fender, see Figure 4, contained in the chambers 16 within the brackets 14, the arms 6 projecting forwardly therefrom through the slots 14' to support the basket in the normal position, Figure 4. From this position the thrust arms 6 carrying the basket swing downwardly to pickup position as shown in Figure 7, in which position the arms 6 project downwardly and forwardly through the bottom slots 14" which in the form shown is continuous with the slot or opening 14' at the front side of the brackets. Important features of the invention reside in the means for timing and controlling the movement of the thrust arms from the upper normal raised position, Figure 4, to the depressed pickup position, Figure 7, and in the manner of controlling and guiding the same to raised position and supporting it therein.

A follower 11 in the form shown is formed on or rigidly secured to the rear end of each thrust arm 6, and mounted to slide and oscillate in a horizontal guideway 18 at the rear of each corresponding bracket 14, said guideways being shown at the lower rear extremities of said brackets. The bottom wall of both of these guideways is shown as slotted at 19, Figure 6, to permit the arm 6 to swing freely in and to the pickup position of the basket. To provide for satisfactory guiding of the thrust arms 6 and to prevent binding, the followers 11 are formed with rolling contact surfaces 20 at the top and 21 at the bottom. The top rolling contact surface of each follower 11 curves downwardly and rearwardly from a top surface 22 and the bottom rolling contact surface 21 curves upwardly and forwardly from a bottom surface 24. The top surface 22 terminates at a top forward edge 25 and bottom flat surface 24 terminates at a bottom rear edge 26. The rear surface of each follower extends upwardly from the edge 26 to meet the contact surface 20 and the forward surface of the follower extends downwardly from the edge 25 to the upper portion of the contact surface 21. The contact surfaces 20 and 21 roll in contact with the top and bottom surfaces of the way 18, the contour of the follower being such that it substantially fills the ways in the raised or normal position of the thrust arms, so that there is no tendency to rattle in this position as shown in Figure 4. As the arms 6 swing downwardly, the followers swing to points of contact of less diameter. Each follower moves from forward position, as in Figure 4, backwardly and then rocks downwardly, with arms 6 as hereinafter described free from any frictional engagement on the part of the follower with the ways. The ways 18 are provided at the front with stop shoulders 18' which limit the forward motion of the followers 11 and help to hold them stationary in the raised position of the fender, i. e., in normal position.

Each hook 12 has a shank 12' which extends upwardly from the corresponding thrust arm 6, near but forwardly of the rear follower 11 as shown, reference being had as previously to the normal or raised position of the basket. The hooks 12 have each a point or forwardly projecting arm 12" with a downwardly disposed surface 28 which in the raised position of the basket and thrust arm 6, see Figure 4, is substantially horizontal. This downwardly disposed supporting surface 28, in the raised or normal position of the fender, takes over and engages the hub 29 of the swinging guide 30 to be further described. This engagement of the hook 12 with the hub 29 constitutes the principal support of the basket and thrust arms in normal raised position, and it is of interest that the supporting surface 28 extends forwardly of its shelf or support on the hub 29 to a considerable degree in the preferred form shown. This arrangement of the hook provides for a considerable dwell of the basket 1 and arms 6 in raised position as they are thrust backwardly and before the release takes place whereby they are permitted to drop as hereinafter described after contact with a person or small animal in the path of the vehicle.

Referring to Figure 8, it will be noted that the swinging guide and support 30 consists of two forks 31, 31' spaced apart and located at each end of the hub 29 inside the chamber 16 of the bracket 14. The hook 12 in the raised position of the parts projects forwardly over the hub 29 between these forks 31 and 31'. The hook 12 is shown as provided above supporting surface 28 with a transverse rider pin 32 which projects on each side of the hook. This pin is engaged by the forks 31 and 31' of the swinging guide 30, one end entering into each fork as the basket swings upwardly from depressed position, and the path of each thrust arm 6 is so controlled that the fork swings backwardly and upwardly and then forwardly to top position whereby the point 12" of the hook is passed over the hub 29 and engaged therewith as already described. Regarding the forks 31 and 31', it will be noted that the rearmost arm 33 of each fork 31, 31' in the depending position of the forks is elongated so as to provide a fork opening at 34, which is disposed forwardly and downwardly in the path of the rider pin 32 as it swings upwardly and/or backwardly, each projecting end of the pin 32 being engaged by one of said forks on each corresponding side as best disclosed in Figure 8. The arms 6 are further guided and supported in raised and in depressed position, and the pin 32 is guided to the seats 35 of the member 30 by way of opening 34 by means of the stationary follower pins 36 which are seated in the brackets 14 extending horizontally across the chambers 16. Each pin 36, one at each side of the apparatus, engages the cam slot 10 in the corresponding thrust arm 6. For convenience this cam slot 10 will be particularly described in connection with the arm or arms 6 in their upper or normal position in which position the cam slot 10 is referred to with substantial correctness as an upright slot, see Figure 4. As shown, it is of a form somewhat resembling the lower half of the letter S. Each pin 36 in the form of the invention shown is supported at both ends in its bracket 14 and it extends intermediately of its bracket through arm 6 and/or hook 12 by way of the slot 10.

In the depressed position of the basket 1 and thrust arms 6, each pin 36 occupies the upper end of the slot 10, in which position the pins serve in connection with the followers 11 to support the arms and basket in depressed position. On account of this function of the upper end of the slot 10, this upper end is referred to as follower seat 37 and to prevent undesired lifting of the basket so that it might pass over and fail to pick up a pedestrian or small animal which had fallen in front of the vehicle, this seat is extended forwardly to a slight degree beyond the upright wall of the slot 10, as indicated at 10'. The portion of each slot 10 extending downwardly from the seat 37 is so formed as to operate in connection with its stationary guide pin 36 to bring the pin 32 into the opening 34 of the forks 31 and 31' to the guide seats 35. In order to properly position this opening to receive the pin 32 as thus guided, each swinging guide member 30 is located in its depending position, Figure 7, by means of a stop 38, best shown in Figure 4. This stop projects on the outside of the bracket 14, being engaged by an arm 39 also on the outside of the bracket 14, which arm 39 is secured to the hub 28 of the swinging guide 30. This arm 39 which is also shown in Figure 1, is controlled by a tension spring 40 connected at one end to the arm 39 and at the other end to a screw 41, which is seated in the end of the arm 6, more particularly in the follower 11, and projects through a horizontal slot 42 in the bracket casing 14. This screw 41 also supports by means of a shoulder 43 a washer 44 which slides on the outside of the casing, engaging the same at the sides of the slot 42. It is of interest that the swinging guides 30 are mounted on the ends of shaft 30' which extends across the fender from one bracket 14 to the other so that guides 30 operate to unseat bolt pins 16 simultaneously.

It is noted that the upper end of the cam guide slot 10 is formed in the shank 12' of the hook 12, although this arrangement, like other details, is subject to variation. The lower end of this slot in the preferred form of the invention extends rearwardly at 45 in a horizontal direction, and there is a seat for the stationary guide pin 36 at the rear end of this slot, the same being indicated by reference character 46. The rearward extension 45 of the slot 10 at the bottom provides a further support for the moving elements of the fender, i. e., the thrust arm 6 and the basket 1 in elevated position, preventing immediate downward motion of the basket 1 and arms 6 in case of slight thrusts, which may be encountered in parking and the like when undesired depression of the basket would be most inconvenient. It will also be noted that the forward wall of the slot 10 at 47 opposite and slightly above seat 46 is substantially upright in the raised position of the basket and arms so that an excessive thrust on the basket due to encountering a fixed obstacle or due to collision with another vehicle would tend to maintain the fender basket in elevated position in which it serves most efficiently as a bumper. To increase this tendency to hold the parts in bumping position under these circumstances the surface 47 is shown as concaved rearwardly providing a pocket, from which the pin 36 escapes when the rearward thrust is relaxed, permitting the basket and arms to drop.

The construction shown also includes a provision for locking the thrust arms and basket in elevated position during parking or at such times as the vehicle may be stationary. In the form shown in Figure 4, this consists of a bell crank lever 49 having an operating arm 50, and a locking arm 51 shown as at an angle to the operating arm 50 which is a little less than 90 degrees. The operating arm 50 is engaged by a tension spring 52, the opposite end of which is connected to the thrust arm 6 by means of a screw 53 and the locking arms 51 are forked at 54 as best shown in Figure 3, there being one arm 51 at each side of the bracket 14, the edges of which at 55 are engaged by the locking arms 51 at the center of each fork at 54', as shown in Figure 3. The spring 52 gives arm 50 a forward tendency whereby arms 6 are normally unlocked.

To apply the lock, the ratchet lever 56, Figure 5, is pulled backwardly and held by a pawl 56'. This lever 56 is connected to the arm 50 oppositely to spring 52 by means of a cord or wire 57 which serves when lever 56 is pulled back to swing the arms 51 upwardly to locking position so that the thrust arms 6 are held in advanced position and can not move backwardly in response to a thrust or be forced backwardly in any way to permit the supporting pins 36 to escape from the seat 46 or the horizontal portion 45 of the slot 10, and hook 12 remains engaged with hub and shelf 29. Under these circumstances the basket 1 and thrust arm 6 must remain in raised or normal position.

The ratchet arm 56 is in the form of the invention shown provided with a contact member 66 in the starter circuit 68. This contact in the advanced position of the arm engages a contact 67 closing the circuit and when the arm is drawn backwardly to lock the basket in normal elevated position, the circuit 68 is broken so that the vehicle can not be started with the fender member or basket locked in elevated position, it being necessary to release the lock and close the starter circuit in order to start the vehicle.

Figure 7 shows swinging lever supports and markers 60 mounted on the lower side of the thrust arms. These are pivotally mounted on short shafts 62, and controlled by tension springs 63, engaging operating arms 64. There is also a positioning arm 65 which engages the bottom of the thrust arm 6 when the thrust arm is elevated to hold the supporting finger 60 in advanced position so that it engages the road surface and swings backwardly as shown to support the basket and thrust arm in depressed position, when the basket and arms 6 drop and tend to rest on the road surface, preventing contact of the basket with the road. The supports 60 may be located in operative position by the engagement of arms 64 with a stop surface 66.

These members 60 of which there are one or more, serve an important function in that they engage the road when the basket drops and produce a relatively permanent mark or marks on the road surface which record the distance through which the vehicle actually advanced between the contact of the basket with a pedestrian and the stopping of the vehicle, thus showing the degree of control exercised by the operator over the vehicle at the time of the accident.

To prevent noises due to vibration, the hollow members 3, 3' and 5 are sprayed as to their inside surfaces with latex or the like forming a coating of rubberlike material at 70, best shown in Figure 2.

Means is also provided for adapting the construction shown to a vehicle having less road clearance so that the downward swing of the fender or basket is required to be shorter. This provision consists of plugs 71 Figures 9 and 10 shaped to fit the upper ends of the slots 10, Figure 7 and having flanges 72 which take over the sides of the shank 12' at the rear of the slot. These plugs are fastened by means of pins or bolts passed through the holes 73 in the flanges 72 and the hole 74 in the shank 12' of the hook 12 which is part of arm 6. In this way the slots 10 are shortened at the top, i. e. their upper ends are closed and the downward path of the fender is correspondingly shortened at its lower end, adapting the pickup fender to use on a vehicle having less road clearance than that to which the apparatus has been originally adapted. The curvature of the block 71 as to its bottom face is preferably formed in correspondence with the curvature of the top of the slot 10, likewise the outer surface of said block above said bottom face is formed to fit the top portion of the slot.

The brackets 14 may be supported in any suitable manner as by means of arms 75 secured in the vehicle frame channels or I beams 76, as shown in Figure 4 by means of bolts 77. These arms have at their forward ends flanges 78 which are secured to the rear walls of brackets 14 by means of bolts 79, or in any suitable manner.

Figures 11, 12, 13 and 14 illustrate the use of a bumper of a preferred type in connection with the fender of the invention. In this construction the bumper 80, of the design shown, is secured by means of a seat or base 81 formed in and of the rear wall 82 of the bracket 14. This seat 81 fits the transverse section of the bumper which at this point is provided with a filler block 83 fitting the inside cross section of the bumper so that the bumper member 80 is held in position and supported on the flanges 78 on the ends of the supporting arms 75 by the mere tightening of the bolts 79. The bumper 80 is also provided with rear supporting bars 85 extending backwardly and inwardly and turned at their rear ends at 86, which rear ends are secured in the channels 76 by means of the bolts 77, which hold the arms 75. The bumper 80 is also shown as coated on the inside, i. e. the rear surface, with rubber or the like, at 84. This may be effected by spraying with latex, as already suggested.

The operation of the device will be considered in connection with the normal position of the same shown in Figure 4. In this position the stationary guide pins 36 engage the rear ends 46 of the horizontal portions 45 of the cam guide slots 10 at the bottom of the same. The moving rider pins 32 also occupy the seats 35 of the swinging guides 30 which at this time are at the top, i. e., above the swinging guide shaft 30'. Also, the hooks 12 are engaged with the hubs 29 of the swinging guides 30, the supporting surfaces 28 of the hooks extending well forwardly of the point of engagement. At this time the cam followers 11 are firmly seated in the forward ends of the guideways 18 at the bottom rear of the brackets 14. The long dimensions 22 to 24 of the follower 11 being so disposed that the followers fit rather closely in the ways to prevent play and consequent rattling. The operation of lock 49 having been fully explained, it will be considered that this lock is disengaged, the vehicle being in motion.

Assuming that the fender comes in contact with a pedestrian or a small animal in the path of the vehicle, the basket 1 transmits to the thrust arm 6 a backward thrust which may be applied at either side or in the center, it being understood that the swinging carrier shaft 30' preferably extends across the vehicle as shown in Figure 1, so that the carriers 30 move together. The carriers 30 and the arm 39 swing anticlockwise as seen in Figure 4. The backward motion is transmitted uniformly to pins 32 and hooks 12 so that the hooks 12 and the arms 6 will be moved backwardly to an equal degree until the supporting surfaces 28 of hooks 12 are free of the shelves or hubs 29. To accomplish this, it is necessary to overcome the tension of the springs 40. The supporting surfaces 28 are not only released from the hub 29, but backward motion of arm 6 causes the stationary follower pins 36 to be released from the horizontal portions 45 of the slots 10. At this time, assuming that the thrust is sufficient and sufficiently prolonged, the arms 6 with the basket 1 are permitted to swing downwardly about the followers 11 which also move backwardly in their ways 18 in response to the thrust. Under the degree of thrust described the basket drops to bottom or pickup position, the stationary follower pins 36 come into engagement with seats 37 at the opposite ends of slots 10 from seats 46 and followers 11 rock and move backward freely from seats 18', 18'', at the front of ways 18. In this lowered position the fender operates as a most efficient pickup device preventing injury to pedestrians and small animals. In running with the basket in raised or normal position, if a slight backward thrust is encountered, the basket will give slightly but will remain in raised position due to the horizontal play provided for as described, and the springs 40 will return it to the forward normal position when the back thrust is relieved.

If an excess back thrust is encountered, the pins 36 engage the forward walls or concave seats 47 of the slots 10 and the downward motion of the fender or basket is arrested in the most efficient bumping position. When this thrust is removed, the fender will be permitted to drop.

When the pickup function has been served, or it is otherwise desired to raise the fender including the basket 1 and thrust arms 6, the fender must be free to move forwardly to a slight degree to release the stationary follower pins 36 from the seats 37. The basket is then easily raised, the contour of the slots 10 serving to bring the pins 32 through the openings 34 of the forks 31, 31' to the seats 35 of the swinging carriers which swing together backward and upward in clockwise direction until the supporting surfaces 28 of the hooks are raised to the top of the hubs or shelves 29 when the tension of the springs 49 with such assistance as may be found desirable, returns the parts to the normal position shown in Figure 4.

I have thus described a preferred and a slightly modified form of the invention, the description being specific and in detail in order that the manner of constructing, applying, operating and using the invention may be fully understood. However, the specific terms herein are used in a descriptive rather than in a limiting sense, the scope of the invention being defined in the claims.

What I claim as new and desire to secure by Letters Patent is:

1. A pickup fender for vehicles comprising stationary supporting means on the front of the vehicle, a stationary follower thereon and a guideway extending in a fore and aft direction to the rear of said follower, a pickup basket member, a movable thrust arm carrying said pickup basket member, said thrust arm being mounted at its rear end on said support and supported thereon in normal running position and in a lower pickup position to swing from one position to the other, the thrust arm having spaced forwardly of its rear end adjacent said support a cam slot which is substantially upright in the normal position of the basket and thrust arm, said slot being engaged by said stationary follower and having seats for said follower at its upper and lower ends, and the thrust arm having rearwardly of said slot a follower which slides and oscillates in the said way on the support the thrust arm having an upright projection in which said slot is located.

2. A pickup fender for vehicles comprising stationary supporting means on the front of the vehicle, a stationary follower thereon and a guideway extending in a fore and aft direction to the rear of said follower, a pickup basket member, a thrust arm carrying said pickup basket member, said thrust arm being mounted at its rear end on said support and supported thereon in normal running position and in a lower pickup position to swing from one position to the other, the thrust arm having spaced forwardly of its rear end adjacent said support a cam slot which is substantially upright in the normal position of the basket and thrust arm, said slot being engaged by said stationary follower and having seats for said follower at its upper and lower ends, and the thrust arm having rearwardly of said slot a follower which slides and oscillates in the said way on the support, the support having a swinging guide member with a seat and the thrust arm having a rider to engage said seat whereby the thrust member is guided upwardly and then forwardly to normal position as it is raised and guided and supported backwardly and downwardly toward pickup position when it encounters a resistance to the forward movement of the basket with the vehicle.

3. A pickup fender for vehicles comprising stationary supporting means on the front of the vehicle, a stationary follower thereon and a guideway extending in a fore and aft direction to the rear of said follower, a pickup basket member, a thrust arm carrying said pickup basket member, said thrust arm being mounted at the rear on said support and supported thereon in normal running position and in a lower pickup position to swing from one position to the other, the thrust arm having spaced forwardly of its rear end adjacent said support a cam slot which is substantially upright in the normal position of the basket and thrust arm, said slot being engaged by said stationary follower and having seats for said follower at its upper and lower ends, and the thrust arm having rearwardly of said slot a follower which slides and oscillates in the said way on the support, the support having a swinging guide member with a seat and the thrust arm having a rider to engage said seat whereby the thrust member is guided upwardly and then forwardly to normal position as it is raised and guided and supported backwardly and downwardly toward pickup position when it encounters a resistance to the forward movement of the basket with the vehicle, the thrust arm, the support and the cooperating parts thereof being duplicated at the two sides of the vehicle and the swinging guides on the two sides of the vehicle having a single shaft extending from one to the other to which they are respectively secured to operate together, a backward thrust serving to release and lower the basket.

4. A pickup fender comprising stationary supporting means on the front of the vehicle, having a stationary follower thereon and a guideway to the rear of said follower, a pickup basket member, a thrust arm carrying said pickup basket member, said thrust arm being mounted at its rear on said support and supported therein in normal running position and in a lower pickup position and adapted to swing from one position to the other, the thrust arm having adjacent said support a cam guide slot, said slot being engaged by said stationary follower and having forwardly and rearwardly offset seats for said follower at its opposite ends, and the thrust arm having rearwardly of said slot a follower which slides and swings in the said way on the support, the thrust arm having adjacent said slot a forwardly disposed hook and a carrier having a shelf to be engaged by the hook in the upper normal position of the basket, the cam slot and ways being arranged to bring the hook into engagement with its shelf as the basket is raised, the fender being trippable to move downwardly by a backward thrust.

5. A pickup fender comprising stationary supporting means on the front of the vehicle, having a stationary follower thereon and a guideway to the rear of said follower, a pickup basket member, a thrust arm carrying said pickup basket member, said thrust arm being mounted at its rear on said support and supported therein in normal running position and in a lower pickup position and adapted to swing from one position to the other, the thrust arm having adjacent said support a cam guide slot, said slot being engaged by said stationary follower and having forwardly and rearwardly offset seats for said follower at its opposite ends, and the thrust arm having rearwardly of said slot a follower which slides and swings in the said way on the support, the thrust arm having a forwardly disposed hook and a carrier having a shelf to be engaged by the hook in the upper normal position of the basket, the cam slot and ways being arranged to bring the hook into engagement with its shelf as the basket is raised, the hook extending forwardly of the shelf in the raised position of the basket to provide for rearward motion of the basket prior to its release from normal position to permit it to drop to pickup position.

6. A pickup fender comprising stationary supporting means on the front of the vehicle, having a stationary follower thereon and a substantially horizontal guide to the rear of said follower, a pickup and bumping basket member, thrust means carrying said pickup and basket member, said thrust means being mounted at its rear in said support and supported thereon in normal running position and in a lower pickup position and to swing from one position to the other, the thrust means having at its rear portion adjacent said support a cam slot which is substantially upright in the normal position of the basket, said slot being engaged by said stationary follower and having seats for said follower at its upper and lower ends, and the thrust means having rearwardly of said slot a follower which slides and swings on the said guide on the support, the thrust arm having a forwardly disposed hook and a carrier having a shelf to be engaged by the hook in the upper normal position of the basket, the hook extending forwardly of the shelf in the raised position of the basket to provide for rearward motion of the basket prior to its release, the support having a swinging guide and the thrust means having a cooperating rider to engage said swinging guide as the basket is raised, swinging the hook about its shelf and guiding it into engagement with said shelf, the parts being trippable by a backward thrust to lower the basket.

7. In a vehicle fender of the type described the combination of a stationary support on the front of the vehicle, a basket and a thrust arm mounted on the support and carrying the basket, the thrust arm and basket being mounted to swing relatively to the support downwardly from normal to pickup position of the basket and vice versa, the thrust arm having a sliding pivot on said support, and a hook with a horizontal engaging surface forward of said pivot, a swinging carrier guide and a rider to engage the swinging guide as the thrust means swings upwardly, a shelf to support the hook, the swinging guide having positioning means whereby it is located to engage said rider as the thrust arm is moved upwardly to swing the hook upwardly about its shelf and horizontally into engagement with said shelf.

8. In a vehicle fender of the type described the combination of a stationary support on the front of the vehicle, a basket and a thrust arm mounted on the support and carrying the basket, the thrust arm being mounted to swing downwardly relatively to the support from normal to pickup position of the basket and vice versa, the thrust means having a sliding pivot support and a forwardly disposed hook forward of said pivot on said support, a swinging carrier guide and a rider to engage the swinging guide as the thrust means swings upwardly, a shelf to support the hook, the swinging guide having positioning means whereby it is located to engage said rider as the thrust means is moved upwardly, the swinging guide operating to swing the hook upwardly about its shelf and forwardly into engagement with said shelf, and additional cooperating guiding means on the thrust member and on the supporting bracket, to bring the rider into engagement with said swinging guide member, the fender being released from normal position by a backward thrust to swing downwardly to pickup position.

9. A vehicle fender having a stationary support at the front of the vehicle, a basket and a forwardly extending thrust arm mounted at its rear end on said support to swing down and up from normal to pickup position and vice versa, the basket being secured to the forward end of said arm, the support having cooperating means for supporting the arm and basket in both said positions and means for guiding the arm with the basket thereof from one position to the other, comprising a guideway and a follower in said guideway secured to the thrust arm, said follower having its greatest radial dimension located transversely of the ways to substantially fill the ways in the normal raised position of the basket and having a lesser radial dimension which is disposed transversely of the ways as the basket swings downwardly from normal position to provide free motion of the basket from normal to pickup position and other cooperating means on the arms and support, respectively for supporting the thrust member in both said positions and for guiding it from one position to the other.

10. In a pickup fender of the type described for a vehicle, a basket, thrust members supporting the basket, carrier supports on the front of the vehicle, cooperating means on said supports and at the rear ends of the thrust members supporting and guiding the thrust members to swing from normal raised, to pickup position of the basket, and vice versa, and adapted to support said thrust members and basket in both said positions, said means comprising ways disposed in a fore and aft direction and a follower in said ways, a cam slot which is substantially upright, a follower engaging said slot, said slot having seats engaging the follower in the normal and in the pickup position of said basket, a hook and a shelf engaged by said hook in the normal position of the basket, the parts being released from normal position by a backward thrust to drop the basket to pick up position.

11. In a pickup fender of the type described for a vehicle, a basket, thrust members supporting the basket, carrier supports on the front of the vehicle, cooperating means on said supports and in the rear ends of the thrust members supporting and guiding the thrust members to swing from normal raised, to pickup position of the basket and vice versa, and adapted to support said thrust members and basket in both said positions, said means comprising ways disposed in a fore and aft direction and followers in said ways, a cam slot which is substantially upright, a follower engaging said slot, said slot having seats engaging the follower in the normal and in the pickup position of said basket, a hook and a shelf engaged by said hook in the normal position of the basket, said cooperating means also including a swinging guide, a rider to engage said swinging guide to bring the hook into engagement with its support as the fender is raised, the cam slot serving to guide said rider into engagement with said swinging guide, and means for positioning the swinging guide to receive the rider.

12. In a pickup fender of the type described a basket, thrust members supporting the basket and supports having means engaging the rear ends of the thrust members supporting the thrust members to swing from normal raised, to pickup position of the basket, supporting said thrust members and basket in both said positions, said means comprising ways disposed in a fore and aft direction and followers in said ways, cam slots which are substantially upright, followers engaging said slots, said slots having seats at their opposite ends engaging the followers in the normal and in the pickup position of said basket, a hook and support engaged by said hook in the normal position of the basket, said cooperating means also including a swinging guide, and a rider to engage said swinging guide to bring the hook into engagement with its support as the fender is raised.

13. In a pickup fender of the type described, for a vehicle, a basket, thrust members supporting the basket, stationary supports on the front of the vehicle, cooperating means on said supports and on the rear ends of the thrust members supporting and guiding the thrust members to swing from normal raised, to pick-up position of the basket and vice versa, and adapted to support said thrust members and basket in both said positions, said means comprising ways disposed in a fore and aft direction and a follower in said ways, a cam slot which is substantially upright, a follower engaging said slot, said slot having seats engaging the follower in the normal and in the pickup position of said basket, a hook and a shelf engaged by said hook in the normal position of the basket, a cam slot having its seat as engaged by the follower in normal position extended in a fore and aft direction and the hook being similarly extended to provide for a slight rearward motion of the fender prior to disengagement and dropping of the fender to pickup position.

14. A pickup fender for motor vehicles having a basket and thrust members with means on the vehicle frame for supporting the thrust members in the normal raised position and a depressed pickup position, and means for guiding the thrust members from one position to the other, the supporting means having means for supporting the thrust members in normal position, said means being adapted to release said thrust members when a backward thrust is applied to the basket permitting them to drop, bringing the basket to pickup position, and means for locking the thrust members to overcome the rearward thrust to prevent an undesired release of the thrust members, said latter means having a control extending within reach of the driving position adapted for operation by the drive.

15. A pickup fender for motor vehicles having a basket and thrust members with means for supporting the thrust members in the normal raised position and a depressed pickup position, the basket being secured to the forward ends of the thrust members, means for guiding the thrust members from one position to the other, the supporting means in normal position being adapted to release the thrust members when a backward thrust is applied to them permitting them to drop, bringing the basket to pickup position, and means for locking the thrust members to overcome the rearward thrust to prevent an undesired release of the thrust members and basket, said locking means having a circuit breaking device connected to the starter circuit to break the circuit when the lock is applied.

16. In a pickup fender of the type described having a basket and thrust means supporting the basket supporting means being adapted to swing from a normal raised to a pickup position of the basket on the receipt of a backward thrust, a marker to engage the road in pickup position of the basket, the same consisting of an arm pivotally mounted at the bottom of the basket to swing forwardly and downwardly and upwardly and rearwardly, and a spring connected to said arm tending to swing it forwardly and downwardly to depending position.

17. In a pickup fender of the type described having a basket and thrust means supporting the basket, the first means being adapted to swing from a normal raised to a pickup position of the basket on the receipt of a backward thrust, a marker to engage the road in pickup position of the basket.

18. A pickup fender for motor vehicles, having a basket and a forwardly-extending thrust member at each side of the vehicle and means for supporting the thrust member with the basket in a normal raised position and in a depressed pickup position of the basket and means for guiding the thrust members from one position to the other, the supporting means in the normal position of the basket being adapted to release the thrust members when a thrust is applied to the basket, permitting them to drop bringing the basket to pickup position, the basket comprising an integral frame of longitudinal members extending from side to side of the vehicle, with end members connecting the same, the completed basket comprising a single integral piece of metal, the frame members being coated as to their convex surfaces with rubber like material to deaden the sound vibrations of the basket.

AUGUST A. ROTH.